(12) United States Patent
Hsu et al.

(10) Patent No.: US 8,423,337 B2
(45) Date of Patent: Apr. 16, 2013

(54) METHOD FOR MULTI-SCALE GEOMECHANICAL MODEL ANALYSIS BY COMPUTER SIMULATION

(75) Inventors: Sheng-Yuan Hsu, Sugar Land, TX (US); Rahul Pakal, Pearland, TX (US); Kevin H. Searles, Kingwood, TX (US); Brian W. Duffy, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 502 days.

(21) Appl. No.: 12/665,597

(22) PCT Filed: Jun. 10, 2008

(86) PCT No.: PCT/US2008/007238
§ 371 (c)(1),
(2), (4) Date: Dec. 18, 2009

(87) PCT Pub. No.: WO2009/029133
PCT Pub. Date: Mar. 5, 2009

(65) Prior Publication Data
US 2010/0191511 A1    Jul. 29, 2010

Related U.S. Application Data

(60) Provisional application No. 60/966,031, filed on Aug. 24, 2007.

(51) Int. Cl.
*G06G 7/50* (2006.01)
*G06G 7/48* (2006.01)
*E21B 47/00* (2006.01)

(52) U.S. Cl.
USPC ....... 703/9; 703/10; 166/250.01; 166/250.03; 166/264

(58) Field of Classification Search ................ 703/9, 10; 166/250.01, 250.03, 264
See application file for complete search history.

(56) References Cited

U.S. PATENT DOCUMENTS 4,821,242 A * 4/1989 Hennington ............. 367/53
5,058,012 A    10/1991 Hinchman et al.
(Continued)

FOREIGN PATENT DOCUMENTS

WO    WO 2007/116008 A1    10/2007
WO    WO 2008/131351 A1    10/2008

OTHER PUBLICATIONS

P. Longuemare, NPL, "Geomechanics in Reservoir Simulation: Overview of Coupling Methods and Field Case Study", 2002.*

(Continued)

*Primary Examiner* — Omar F. Fernandez Rivas
*Assistant Examiner* — Angel Calle
(74) *Attorney, Agent, or Firm* — ExxonMobil Upstream Research Company—Law Department

(57) ABSTRACT

A method of predicting earth stresses in response to changes in a hydrocarbon-bearing reservoir within a geomechanical system includes establishing physical boundaries for the geomechanical system, acquiring logging data from wells drilled, and acquiring seismic data for one or more rock layers. The well and seismic data are automatically converted into a three-dimensional digital representation of one or more rock layers within the geomechanical system, thereby creating data points defining a three-dimensional geological structure. The method also includes (a) applying the data points from the geological structure to derive a finite element-based geomechanical model, and (b) initializing a geostatic condition in the geomechanical model, and then running a geomechanics simulation in order to determine changes in earth stresses associated with changes in pore pressure or other reservoir characteristics within the one or more rock layers.

30 Claims, 6 Drawing Sheets

U.S. PATENT DOCUMENTS

| Patent | Type | Date | Inventor | Ref |
|---|---|---|---|---|
| 5,321,612 | A * | 6/1994 | Stewart | 702/13 |
| 5,416,697 | A | 5/1995 | Goodman | |
| 5,740,342 | A | 4/1998 | Kocberber | |
| 5,848,379 | A | 12/1998 | Bishop | |
| 5,892,732 | A | 4/1999 | Gersztenkorn | |
| 5,930,730 | A | 7/1999 | Marfurt et al. | |
| 5,986,974 | A | 11/1999 | Luo et al. | |
| 6,078,869 | A | 6/2000 | Gunasekera | |
| 6,106,561 | A | 8/2000 | Farmer | |
| 6,131,071 | A | 10/2000 | Partyka et al. | |
| 6,196,318 | B1 | 3/2001 | Gong et al. | |
| 6,256,603 | B1 | 7/2001 | Celniker | |
| 6,266,619 | B1 | 7/2001 | Thomas et al. | |
| 6,460,006 | B1 | 10/2002 | Corcoran | |
| 6,549,854 | B1 | 4/2003 | Malinverno et al. | |
| 6,597,995 | B1 | 7/2003 | Cornu et al. | |
| 6,640,190 | B2 | 10/2003 | Nickel | |
| 6,654,692 | B1 | 11/2003 | Neff | |
| 6,668,922 | B2 | 12/2003 | Ziauddin et al. | |
| 6,745,159 | B1 | 6/2004 | Todd et al. | |
| 6,751,558 | B2 | 6/2004 | Huffman et al. | |
| 6,754,587 | B1 | 6/2004 | Trappe et al. | |
| 6,766,255 | B2 | 7/2004 | Stone | |
| 6,785,641 | B1 | 8/2004 | Huang | |
| 6,804,609 | B1 | 10/2004 | Brumbaugh | |
| 6,810,332 | B2 | 10/2004 | Harrison | |
| 6,813,564 | B2 | 11/2004 | Eiken et al. | |
| 6,836,731 | B1 | 12/2004 | Whalley et al. | |
| 6,840,317 | B2 | 1/2005 | Hirsch et al. | |
| 6,842,700 | B2 | 1/2005 | Poe | |
| 6,892,812 | B2 | 5/2005 | Niedermayr et al. | |
| 6,901,391 | B2 | 5/2005 | Storm, Jr. et al. | |
| 6,941,255 | B2 | 9/2005 | Kennon et al. | |
| 6,947,843 | B2 | 9/2005 | Fisher et al. | |
| 6,978,210 | B1 | 12/2005 | Suter et al. | |
| 6,980,929 | B2 | 12/2005 | Aronstam et al. | |
| 6,980,940 | B1 | 12/2005 | Gurpinar et al. | |
| 7,043,410 | B2 | 5/2006 | Malthe-Sorenssen et al. | |
| 7,054,752 | B2 | 5/2006 | Zabalza-Mezghani et al. | |
| 7,062,420 | B2 | 6/2006 | Poe, Jr. | |
| 7,066,019 | B1 | 6/2006 | Papanastasiou | |
| 7,089,166 | B2 | 8/2006 | Malthe-Sorenssen et al. | |
| 7,089,167 | B2 | 8/2006 | Poe | |
| 7,099,811 | B2 | 8/2006 | Ding et al. | |
| 7,113,869 | B2 | 9/2006 | Xue | |
| 7,177,764 | B2 | 2/2007 | Stone | |
| 7,181,380 | B2 | 2/2007 | Dusterhoft et al. | |
| 7,188,058 | B2 | 3/2007 | Hardy et al. | |
| 7,191,062 | B2 | 3/2007 | Chi et al. | |
| 7,200,539 | B2 | 4/2007 | Ong et al. | |
| 7,369,979 | B1 | 5/2008 | Spivey | |
| 7,561,998 | B2 | 7/2009 | Panga et al. | |
| 7,603,261 | B2 | 10/2009 | Tardy | |
| 7,657,415 | B2 | 2/2010 | Panga et al. | |
| 2002/0013687 | A1 | 1/2002 | Ortoleva | |
| 2002/0029137 | A1 | 3/2002 | Malthe-Sorenssen et al. | |
| 2002/0049575 | A1 | 4/2002 | Jalali et al. | |
| 2002/0055868 | A1 | 5/2002 | Dusevic et al. | |
| 2002/0120429 | A1 * | 8/2002 | Ortoleva | 703/2 |
| 2002/0169559 | A1 | 11/2002 | Onyia et al. | |
| 2004/0010373 | A1 | 1/2004 | Smits et al. | |
| 2004/0122640 | A1 * | 6/2004 | Dusterhoft | 703/10 |
| 2004/0199329 | A1 | 10/2004 | Stone | |
| 2005/0015204 | A1 | 1/2005 | Xue | |
| 2005/0015231 | A1 | 1/2005 | Edwards et al. | |
| 2005/0043890 | A1 | 2/2005 | Sanstrom | |
| 2005/0065730 | A1 | 3/2005 | Sinha | |
| 2005/0121197 | A1 | 6/2005 | Lopez de Cardenas et al. | |
| 2005/0125203 | A1 | 6/2005 | Hartman | |
| 2005/0149307 | A1 | 7/2005 | Gurpinar et al. | |
| 2005/0197813 | A1 | 9/2005 | Grayson | |
| 2005/0199391 | A1 | 9/2005 | Cudmore et al. | |
| 2005/0209836 | A1 | 9/2005 | Klumpen et al. | |
| 2005/0267719 | A1 | 12/2005 | Foucault | |
| 2005/0273302 | A1 | 12/2005 | Huang et al. | |
| 2005/0273304 | A1 | 12/2005 | Oliver et al. | |
| 2006/0015310 | A1 | 1/2006 | Husen et al. | |
| 2006/0047431 | A1 | 3/2006 | Geiser | |
| 2006/0047489 | A1 | 3/2006 | Scheidt et al. | |
| 2006/0085174 | A1 | 4/2006 | Hemanthkumar et al. | |
| 2006/0100837 | A1 | 5/2006 | Symington et al. | |
| 2006/0104158 | A1 * | 5/2006 | Walls et al. | 367/73 |
| 2006/0149518 | A1 | 7/2006 | Oliver et al. | |
| 2006/0153005 | A1 | 7/2006 | Herwanger et al. | |
| 2006/0224370 | A1 | 10/2006 | Siebrits et al. | |
| 2007/0083330 | A1 | 4/2007 | Frenkel | |
| 2007/0156377 | A1 | 7/2007 | Gurpinar et al. | |
| 2007/0244681 | A1 | 10/2007 | Cohen et al. | |
| 2007/0271077 | A1 | 11/2007 | Kosmala et al. | |
| 2007/0294034 | A1 * | 12/2007 | Bratton et al. | 702/6 |
| 2008/0015831 | A1 | 1/2008 | Tardy et al. | |
| 2008/0015832 | A1 | 1/2008 | Tardy | |
| 2008/0033656 | A1 | 2/2008 | Herwanger | |
| 2008/0319674 | A1 | 12/2008 | Dai et al. | |
| 2009/0055098 | A1 | 2/2009 | Mese et al. | |
| 2009/0216508 | A1 * | 8/2009 | Dale et al. | 703/10 |
| 2009/0294122 | A1 | 12/2009 | Hansen et al. | |
| 2011/0166843 | A1 * | 7/2011 | Hsu et al. | 703/10 |

OTHER PUBLICATIONS

C. David, NPL, "Rock physics and geomechanics in the study of reservoirs and repositories", Jan. 2007.*

Baeten, G.J.M., et al., Directional Deconvultion in the F-X Domain, Abstract 1991:5004, Sep. 23-27, 1990, 60$^{th}$ Annual Seg. Int'l Meeting.

Da Silva, F.V., et al., "Casing Collapse Analysis Associated with Reservoir Compaction and Overburden Subsidence", SPE 20953, Oct. 23-24, 1990, pp. 127-133, Europec 90, The Hague, Netherlands.

Fredrich, J.T., et al., "Three-Dimensional Geomechanical Simulation of Reservoir Compaction and Implications for Well Failures in the Belridge Diatomite", SPE 36698, Oct. 6-9, 1996, pp. 195-210, 1996 SPE Annual Technical Conf. and Exh., Denver, CO.

Häusler, H., et al., "A New Exploration Approach in a Mature Basin: Integration of 3-D Seismic, Remote-Sensing, and Microtectonic Data, Southern Vienna Basin, Austria", 2002, pp. 433-451, AAPG Studies in Geology No. 48 and SEG Geophysical References Series No. 11.

Lee, T-Y., et al., "History Matching by Spline Approximation and Regularization in Single-Phase Areal Reservoirs", Sep. 1986, pp. 521-534, SPE Reservoir Engineering.

Olden, P., et al., "Modeling Combined Fluid and Stress Change Effects in the Seismic Response of a Producing Hydrocarbon Reservoir", Oct. 2001, pp. 1154-1157, The Leading Edge.

Pöppelreiter, M., et al., "Structural Control on Sweet-Spot Distribution in a Carbonate Reservoir: Concepts and 3-D Models (Cogollo Group, Lower Cretaceous, Venezuela)", Dec. 2005, pp. 1651-1676, vol. 89, No. 12, AAPG Bulletin.

Roumboutsos, A., "The Application of Deconvolution in Well Test Analysis", Abstract 1989:20444, Dissertation, Jul. 1989, Jeropt Watt Imoversotu.

Schutjens, P., "On the Stress Change in Overburden Resulting from Reservoir Compaction: Observations from Two Computer Models and Implications for 4D Seismic", May 2007, pp. 628-634, The Leading Edge.

International Search Report, dated Sep. 10, 2008, PCT/US2008/07438.

* cited by examiner

METHOD FOR MULTI-SCALE GEOMECHANICAL MODEL ANALYSIS BY COMPUTER SIMULATION

CROSS REFERENCE TO RELATED APPLICATIONS

This application is the National Stage entry under 35 U.S.C. 371 of PCT/US2008/007238 that published as WO 2009/029133 and was filed on 10 Jun. 2008, which claims the benefit of U.S. Provisional Application No. 60/966,031, filed on 24 Aug. 2007, each of which is incorporated by reference, in its entirety, for all purposes.

BACKGROUND OF THE INVENTION

1. Field of the Invention

The present invention relates to the field of geomechanical modeling. More specifically, the present invention relates to the analysis of earth stresses associated with hydrocarbon recovery processes.

2. Background of the Invention

A subterranean hydrocarbon-bearing reservoir is confined by a state of in-situ tectonic stress. When producing hydrocarbons from the reservoir, the stress state of the reservoir may change. When the state of stress within and above the hydrocarbon-bearing reservoir exceeds the mechanical limits of wells completed in the production area, the completion assemblies forming the wells may be damaged.

A concern may also exist with respect to the effect that fluid removal from the reservoir may have at the earth surface. In this respect, in situ hydrocarbons provide pore pressure which acts against the overburden and which supports the rock strata above the formation. The removal of hydrocarbons, particularly when the rock matrix in the subsurface reservoir is weak, causes a reduction in pore pressure. When this occurs, the weight of the overburden is increasingly supported by the rock matrix, causing a compaction of the subsurface formation in response to the increased stress. This, in turn, can cause a subsidence of the earth at the surface.

The inverse can also occur in connection with fluid injection. Injection operations may be conducted as part of enhanced oil recovery, such as the injection of steam or brine into a producing formation. Injection operations may also occur simply in connection with a water disposal program. The injection of fluids into the subsurface formation will cause an increase in pore pressure within the targeted formation. This, in turn, can create stresses in the formation that may affect wellbore casings. Further, increased pore pressure may cause heave at the surface of the earth.

It may be desirable for the analyst to predict the likelihood or extent of earth movement as a result of subsidence or heave. In some instances, earth movement is sought to be controlled in order to avoid environmental or hydrogeological impact. In this respect, changing the contour and relief of the earth surface can change runoff patterns, affect vegetation patterns, and impact watersheds.

It may also be desirable to predict local changes in the in-situ state of stress and the impact of such changes on well integrity over the life of reservoir production. Subsidence particularly has the potential of damaging production wells formed in a production area. In this respect, downward earth movement can create damaging hoop and compressional stresses on wellbore casings, cement jobs, and downhole equipment.

To anticipate changes in geomechanical stress, it has been proposed to use an integrated geomechanical and reservoir analysis. Newer and more sophisticated measurement techniques have demonstrated that variations in reservoir deliverability are related to interactions between changing fluid pressures, rock stresses and flow parameters. For instance, Young's modulus and Poisson's ratio are related to porosity.

It is desirable to model changes in geomechanical stress through finite element analysis. Finite element analysis involves the representation of individual, finite elements of a geological system in a mathematical model, and the solution of the model in the presence of a predetermined set of boundary conditions. Changes to the system are predicted as fluid pressures change.

In finite element modeling, the region that is to be analyzed is broken up into sub-regions called elements. The process of dividing a production area under study into sub-regions may be referred to as "discretization" or "mesh generation." A mesh is a collection of elements that fill a space, with the elements being representative of a system which resides in that space. In finite element modeling, the region that is to be analyzed is represented by functions defined over each element. This generates a number of local functions that are less complicated than those which would be required to represent the entire region.

Finite element models have been used for analyzing production-induced earth stress changes associated with hydrocarbon recovery processes. For example, U.S. Pat. No. 6,766,255 describes a method of determining subsidence in a producing reservoir. However, it is desirable to have an improved geomechanical modeling method that automatically builds a three-dimensional map-based model from subsurface data, and then converts the map-based model into a finite-element-based model. A need further exists for a geomechanical model that predicts in situ stress changes by employing a computer simulation and analysis using representative, multi-scale geomechanical models and submodels. Still further, a need exists for a systematic method for multi-scale model development and computer simulation of fluid injection and withdrawal to predict changes in earth stresses associated with reservoir compaction-dilation, or surface subsidence-heave. A need also exists for a geomechanical model that corrects nonconformities in the earth layers, thereby accounting for pinchouts and erosive zones.

SUMMARY OF THE INVENTION

A computer-implemented method for the automated modeling of a three-dimensional geomechanical system is provided. Preferably, the geomechanical system comprises a hydrocarbon reservoir. In one aspect, the method includes defining physical boundaries for the geomechanical system, and then acquiring data within those physical boundaries. The data may include mechanical properties of rock formations within the physical boundaries, pore pressure history taken from production activities within the physical boundaries, and subsurface data for the rock formations within the physical boundaries. The production activities may comprise the withdrawal of hydrocarbons from a reservoir, the injection of fluids into the reservoir, or combinations thereof.

Based at least in part on this data, a finite element mesh is automatically created. The finite element mesh defines a plurality of nodes representing points in space, with each point having potential displacement in more than one direction. It is preferred that the mesh provides a positive value for any rock formations that show to have a zero thickness as derived from the subsurface data. In this way, a positive volume is created for each rock formation.

In one aspect, automatically creating a finite element mesh is performed by running a utility program that is compatible with a geomechanical solver program.

The method further includes mapping the pore pressure within the geomechanical system at a first time for nodes within the mesh, mapping the pore pressure for the geomechanical system at a plurality of additional times to correspond to the nodes within the mesh, and then running a geomechanical simulation for the geomechanical system to simulate the effects of changes in pore pressure on stress in the rock formations. In one aspect, running a geomechanical simulation for the geomechanical system is performed by running the geomechanical solver program.

In one embodiment, the changes in pore pressure within the rock formations are designed to simulate a decrease in pore pressure in connection with a production of hydrocarbons from the hydrocarbon reservoir. In another embodiment, the changes in pore pressure within the one or more rock formations are designed to simulate an increase in pore pressure in connection with an injection of fluids into the hydrocarbon reservoir.

Other reservoir characteristics besides or in addition to pore pressure may be loaded and mapped. These include temperature history, permeability and porosity.

In one aspect, the method further includes creating a complimentary finite-element-based submodel having increasing levels of refinement from the finite element mesh.

In another aspect, the physical boundaries for the geomechanical system and the subsurface data for the rock formations within the physical boundaries are entered into a pre-processor program to create a grid in a map-based computer model. Preferably, the grid in the map-based computer model defines a three-dimensional grid. The three-dimensional grid defines nodes in a geological structure that are converted into the nodes of the finite element mesh as a result of creating the finite element mesh. More preferably, the three-dimensional grid is automatically compiled from the subsurface data. Such subsurface data may include, for example, well logging data, seismic data, or combinations thereof.

In one aspect, the method further includes acquiring fluid flow history within the physical boundaries, and mapping the pressure distribution due to the flow history within the physical boundaries. Preferably, a distance-based weighted function and a searching algorithm are used to do the mapping of the pressure distribution. In another aspect, the method further includes acquiring temperature history within the physical boundaries.

In one embodiment of the methods, the physical boundaries for the geomechanical system and the subsurface data for the rock formations within the physical boundaries are entered into a pre-processor program. The pre-processor program automatically creates a three-dimensional grid in a map-based computer model. The subsurface data may include well-logging data. In this instance, the three-dimensional grid is automatically compiled from the well logging data into a three-dimensional digital representation using an ASCII data-to-ZMap programming function. In one aspect, the pre-processor program automatically accounts for and repairs any singular geologic entities in the rock formations such as pinchouts and erosional features.

In one embodiment, the method further includes initializing a geostatic condition of the finite element mesh before running the geomechanical simulation. Preferably, the geostatic condition is initialized based upon data from leak-off tests, well logging data, records of sand production from wells produced within the physical boundaries of the geomechanical model, completion test records, or combinations thereof. Alternatively, or in addition, the geostatic condition may be initialized based upon reviewing a history of casing failures from wells within the physical boundaries of the geomechanical model.

Another computer-implemented method for the automated modeling of a geomechanical system is provided herein. The geomechanical system includes subsurface rock layers, and is preferably a hydrocarbon reservoir. The method includes creating a map-based geologic model from well logging data and seismic data, with the map-based geologic model defining a three-dimensional, digital representation of the geomechanical system. The method also includes deriving a finite element-based global geomechanical model from the map-based geologic model, and deriving a complementary finite element-based submodel or multiple submodels having increasing levels of refinement from the global geomechanical model. Creating a map-based geologic model automatically accounts for and repairs singular geologic entities such as pinchouts and erosional features.

In one aspect, creating a map-based geologic model comprises automatically stacking two or more rock layers within physical boundaries of the geomechanical system without having to manually stack the well logging data and the seismic data.

In one embodiment, the method further includes integrating rock material properties into the finite element-based global geomechanical model, initializing a geostatic condition of the finite element-based geomechanical model, and running a geomechanics simulation in order to determine changes in earth stresses associated with changes in pore pressure within the subsurface rock layers. Initializing a geostatic condition of the finite element-based geomechanical model may comprise reviewing well logging data, reviewing drilling records, reviewing completion test records, reviewing records of sand production from the wells within the physical boundaries of the geomechanical model, or combinations thereof. Alternatively, or in addition, initializing a geostatic condition of the finite element-based geomechanical model further may comprise reviewing a history of casing failures from the wells within the physical boundaries of the geomechanical model, or combinations thereof.

A method of predicting earth stresses in response to changes in pore pressure in a hydrocarbon-bearing reservoir within a geomechanical system is also provided herein. In one embodiment, this method includes establishing physical boundaries for the geomechanical system, and then acquiring data within those physical boundaries. The data may include well logging data from wells drilled within the physical boundaries of the geomechanical system, and seismic data for one or more rock layers within the physical boundaries of the geomechanical system.

Based at least in part on this data, a three-dimensional digital representation of the one or more rock layers within the geomechanical system is created. The digital representation is created by automatically converting the well logging data and the seismic data into the digital representation, thereby creating data points defining a three-dimensional geological structure. The data points from the geological structure are applied to derive a finite element-based geomechanical model in the form of a mesh.

The method further includes integrating rock material properties into the mesh, and initializing a geostatic condition of the finite element-based geomechanical model. Still further, the method includes running a geomechanics simulation. The purpose of the simulation is to determine changes in earth stresses associated with changes in pore pressure within the one or more rock layers.

Preferably, automatically converting the well logging data and the seismic data into a three-dimensional digital representation employs an ASCII data-to-ZMap programming function. In addition, automatically converting the well logging data and the seismic data into a three-dimensional digital representation preferably comprises stacking two or more rock layers within the physical boundaries of the geomechanical system without having to manually merge the well logging data and the seismic data. Preferably, automatically converting the well logging data and the seismic data into a three-dimensional digital representation automatically accounts for and repairs any singular geologic entities such as pinchouts and erosional features.

BRIEF DESCRIPTION OF THE DRAWINGS

So that the manner in which the features of the present invention can be better understood, certain drawings and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
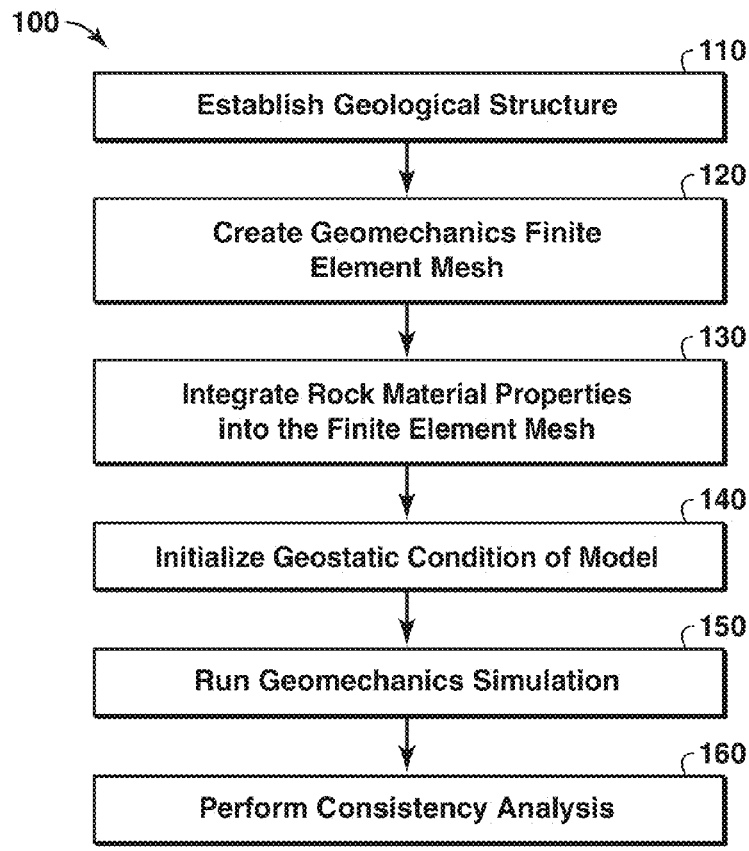
FIG. 1 is a flow diagram illustrating a geomechanical modeling method according to one embodiment of the invention.

As used herein, the term "burial" refers to a geologic process, whether continuous or discontinuous, and whether related to sedimentary deposition, volcanic eruption and/or other geologic process wherein multiple strata are placed in a substantially successive manner, one stratum atop another, in a corresponding series of stratum-producing phases leading to a formation's creation. As used herein, where the term "burial" is associated with a rock property value (e.g., Poisson's Ratio or Young's Modulus) for a stratum of interest, the term designates a virtual value of the rock property for each stratum considered pertinent to developing a stratigraphic model suitable for performing the desired stress analysis of the formation. Depending on the formation, the oldest stratum and the successively newer strata of interest can be produced in any one of the primary geologic eras.

"Lithology" means a description of the physical and approximate compositional character of a rock based on a variety of rock attributes, including without limitation, color, structures, grain size and mineralogic components. One or more of these attributes may be determined by visual evaluation (by eye alone or assisted by a magnifier), seismic interpretation and/or well log interpretation.

"Strain" means a measure of the extent to which a body of material is deformed and/or distorted when it is subjected to a stress-inducing force. "Stress-Inducing Force" refers to an action of at least one force, load and/or constraint on a body of material that tends to strain the body. Examples of the body's deformation or distortion can include, without limitation, changes in the body's length (e.g., linear strain), volume (e.g., bulk strain) and/or a lateral displacement between two substantially parallel planes of material within the body (e.g., shear strain).

"Stress" is a measure of inter-particle forces arising within a body of material resisting deformation and/or distortion, in response to a stress-inducing force applied to the body, as particles within the body of material work to resist separation, compression and/or sliding.

"Principal Stress" means any one of three inherent normal stresses, each perpendicular to the other, in a predetermined coordinate system where the three corresponding shear stresses are equal to zero. Generally, though not always, one of the principal stresses is substantially vertical in a formation, while the two remaining principal stresses are substantially horizontal. While there is no requirement for the principal stresses to be vertical or horizontal, for ease of discussion herein, the three principal stresses, are referred to as principal vertical stress, $\sigma_{vert}$, greater principal horizontal stress, $\sigma_{horiz-1}$ and lesser principal horizontal stress, $\sigma_{horiz-2}$.

"Poisson Ratio," or "$\upsilon$," means, for a substantially elastic body of material when placed under a substantially uniaxial stress, the ratio of the strain normal to the uniaxial stress to the strain parallel to the uniaxial stress.

"Elastic stress to-strain modulus" means a ratio of stress applied to a body versus the strain produced. Elastic stress-to-strain moduli include, without limitation, Young's modulus, ("E"), bulk modulus ("K"), and shear modulus ("G").

"Young's Modulus" ("E") means, for a substantially elastic body of material when placed under a substantially uniaxial stress less than the material's yield strength, whether a tension or compression stress, the ratio of the uniaxial stress, acting to change the body's length (parallel to the stress), to the fractional change in the body's length.

"Elastic" means a body of material capable of sustaining deformation and/or distortion without permanent loss of size or shape in response to a stress-inducing force, whether the body's response is linear elastic or non-linear elastic.

"Inelastic" or "Plastic" means that any deformation and/or distortion to a body of material subjected to a stress-inducing force is permanent, i.e. deformation/distortion remains after the force is removed.

"Yield Strength" means the stress value at which deformation resulting from a stress-inducing force becomes permanent. At that stress value, a body of material, which previously exhibited an elastic response, will begin to exhibit a plastic response to the stress-inducing force.

"Subsurface" means beneath the top surface of any mass of land at any elevation or over a range of elevations, whether above, below or at sea level, and/or beneath the floor surface of any mass of water, whether above, below or at sea level.

"Formation" means a subsurface region, regardless of size, comprising an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation may contain numerous geologic strata of different ages, textures and mineralogic compositions. A formation can refer to a single set of related geologic strata of a specific rock type, or to a whole set of geologic strata of different rock types that contribute to or are encountered in, for example, without limitation, (i) the creation, generation and/or entrapment of hydrocarbons or minerals and (ii) the execution of processes used to extract hydrocarbons or minerals from the subsurface.

"Tectonic" means pertaining to, causing or arising from a subsurface region's movement and/or deformation, whether by vibration and/or displacement, including, without limitation, rock faulting, rock folding and/or a volcanic event.

"Calibrated" means to bring a numerical model to a state consistent with observed conditions within a degree of deviation acceptable for the desired analysis. Typically, those skilled in the art of formation modeling will calibrate a model to a virgin stress distribution (i.e., before any man-induced, stress-altering event occurs in the formation). It will be understood, however, that a model can be calibrated to another stress state of interest including, without limitation, a formation's present-day, non-virgin stress distribution, by first calibrating to a virgin stress distribution based on stress data obtained (i) from at least one location in the formation not materially affected by the man-induced event and/or (ii) before the man-induced event occurred in the formation. Once a formation is calibrated to its virgin stress distribution, any man-induced, stress-altering events can then be accounted for to bring the model to a present-day, non-virgin stress distribution.

Description of Selected Specific Embodiments

FIG. 1 presents a flow diagram illustrating a geomechanical modeling method 100 according to one embodiment. The method 100 sets out steps that may be followed for the purpose of developing a numerically tractable, multi-scale geomechanical modeling framework suitable for computer simulation.

In accordance with the method 100, the first step is to establish a geologic structure for the reservoir under study. This step is represented by Box 110. The purpose is to create a three-dimensional, map-based model from subsurface data.

In creating the geologic structure 110, the geologist or engineer (sometimes referred to generically herein as "the analyst") acquires one or more types of subsurface data. Such data may include well logging data, seismic data, or reservoir simulation data. The analyst then applies certain computer-implemented tools to generate a map representing the geological structure of the production area.

Figure 2:
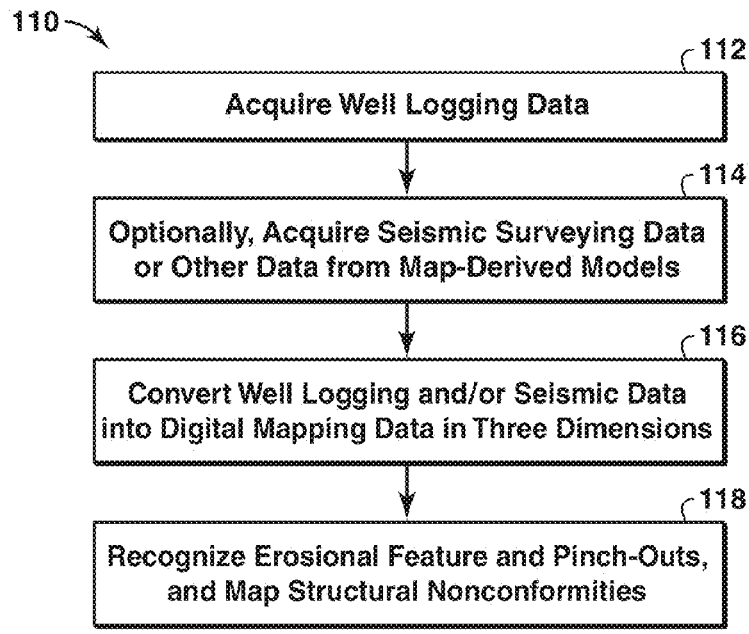
FIG. 2 is a flow diagram illustrating steps for establishing the geologic structure for the geomechanical modeling method of FIG. 1, in one embodiment.

Preferred steps for creating the geologic structure 110 are generally outlined in FIG. 2. FIG. 2 provides a flow diagram illustrating steps for establishing the geologic structure for the geomechanical modeling method of FIG. 1, in one embodiment.

As indicated in FIG. 2, the analyst may acquire well logging data. This step is shown at Box 112. One of ordinary skill in the art will understand that a well log relies upon a sensing device that is run down a wellbore, typically on a wire line. Well logs provide interpretative evidence as to the make-up of a formation as a function of depth. Examples of well logs that might be employed in step 112 to create the geological structure 110 include gamma ray logs, density logs, resistivity logs, porosity logs and sonic logs.

The analyst may also acquire data from "map-derived models." This is shown in Box 114 of FIG. 2. Map-derived models would typically include data that exists from field-wide surveys. Such surveys may include well logging data from wells around the field. However, such data primarily includes seismic surveys across an area under study.

As one of ordinary skill in the art will understand, seismic exploration methods are employed for the purpose of obtaining knowledge about geological structures in the subsurface. Seismic exploration represents an attempt to map the subsurface of the earth by sending sound energy down into the ground, and then recording the "echoes" that return from the rock layers below. The source of the down-going sound energy might come from explosive charges or seismic vibrators on land, or air guns in a marine environment.

Seismic testing employs sensors such as geophones and hydrophones. The sensors are lined up successively to receive the returned waves, or echoes. The returning waves are registered on the surface by the sensors as digital samples. The digital samples are usually acquired at 0.004 second (4 millisecond) intervals, although 2 millisecond and 1 millisecond intervals are also known. Thus, each sample is associated with a travel time, including a two-way travel time in the case of reflected energy.

During a seismic survey, the energy source is moved across the surface above the geologic structure of interest. Each time the source is detonated, it is recorded at various locations on the surface of the earth by the sensors in the form of a time series. Such a time series represents the incoming seismic energy by amplitude variations. Multiple explosion/recording combinations are combined to create a near continuous profile of the subsurface that can extend for many miles. The end result is a depiction of the geological layers.

In the step of establishing the geologic structure 110, the analyst will take the well log and/or seismic data and convert it into a digital representation of a subsurface area. This is shown in Box 116 of FIG. 2. Preferably, the data from the seismic surveys and well logging data is input into a known geological gridding program. An example of such a program is FloGrid™ offered by GeoQuest of Houston, Tex. GeoQuest is the software division of Schlumberger Information Solutions (SIS), an operating unit of Schlumberger OilField Services. The FloGrid program is described in U.S. Pat. No. 6,106,561 which is incorporated herein by reference in its entirety.

FloGrid™ is most typically used as a "pre-processor" for reservoir analysis. FloGrid™ constructs fluid-flow simulation grids for use in a reservoir simulator such as Schiumberger's ECLIPSE™ program. Reservoir data such as the porosity and permeability of the rock matrix is loaded into the program, and a simulation grid or "mesh" is created for the reservoir simulator.

A reservoir simulator, in turn, creates a mathematical model of a reservoir. In operation, a designated reservoir volume is divided into a large number of interconnected cells. The average permeability, porosity and other rock properties are then estimated for each cell. The process makes use of data from well logs, seismic surveys, and rock cores recovered when wells are drilled. Production from the reservoir can then be mathematically modeled by numerically solving a system of three or more nonlinear, partial differential equations describing fluid flow in the reservoir.

In the method 100, the geological gridding program is being used as a map-based model for the geological structure 110. However, the map-based model will not be entered into a traditional reservoir simulator; rather, as will be described more fully below, the geological structure 110 created from the map-based model will be converted into a finite element model. In this way, geomechanical stress modeling can be conducted.

The mesh that is created by FloGrid™ and other known geological analysis software programs is generally horizontal. This means that a two-dimensional map is created based upon the subsurface data that is loaded into the pre-processor. In other words, the data is used to create a two-dimensional representation of the production area under study at a selected depth. However, a multi-scale or three-dimensional mesh is not automatically created.

It is known to create a three-dimensional map from a pre-processor program output by stacking a series of two-dimensional representations generated by the program. However, this is a manual process that tends to be very time-consuming. In practice, the analyst acquires logging data from various exploratory wells. Depth corrections may be made, and the well logs are then used to identify strata and perform depth correlations between wells. Subsurface structures or facies may then be mapped through a process of manually stacking layers.

The present method 100 employs, in one aspect, a modified pre-processor that includes an automatic stacking function. This means that the conversion step 116 automatically creates a three-dimensional model from the survey data without having to manually stack sequential horizontal layers. The modified pre-processor can stratify the subsurface formation under study and map properties that are common to wells. Optionally, the modified pre-processor can also derive properties such as elastic constants in order to provide a mechanical description of the layered structure that has been upscaled from a two-dimensional model.

To prepare the three-dimensional model, the layer structure and layer properties are derived from the well logging data obtained in step 112 and the seismic survey data obtained in step 114. The data is correlated with depth, and then merged with the modified pre-processor software to create the geological structure 110. In this manner, a three-dimensional map is automatically created. The map includes data at various strata including porosity, permeability, temperature and pressure.

In order to provide the automatic three-dimensional conversion, an ASCII Data-to-ZMap programming function may be used. ASCII is an acronym for "American Standard Code for Information Interchange." This is a character encoding program based on the English alphabet. In general, ASCII is a seven-bit code, meaning it uses bit patterns represented with seven binary digits (a range of 0 to 127 decimal) to represent character information.

The character information is converted to a ZMap file format. "ZMap" is a name given to a particular industry file format having its own characteristic header information. Header information describes the size of the domain, that is, the min-x, the max-x, the min-y, and the max-y. This, in turn, is a reference to the offset from some global reference coordinate in a given plane or depth. The ZMap program provides a corresponding "z" coordinate value for each reference point within the plane. The "z" coordinate value corresponds to elevation or surface changes at the various locations within the plane. Thus, the ZMap format places the coordinate data in a particular format such that a description is provided in three dimensions, to with, "x," "y" and "z."

In operation, the modified pre-processor interpolates points in the ZMap format from the map-derived model in order to provide additional data points for building the three-dimensional structure 110. The Z-map file produces collapsed nodes where unconformities, pinch-outs and erosive zones occur. As discussed further below, positive volume is accorded to these collapsed nodes to correct for unconformities, pinch-outs and erosive zones.

It is also noted that when a two-dimensional mesh is created by FloGrid™ or other geological analysis software, the mesh is not only horizontal, but is also in the form of a very thin layer. When the collective thin layers of meshes are stacked under a known manual technique, the new three-dimensional mesh does not accurately recognize erosional features and pinch outs that may naturally exist in the reservoir.

Figure 3:
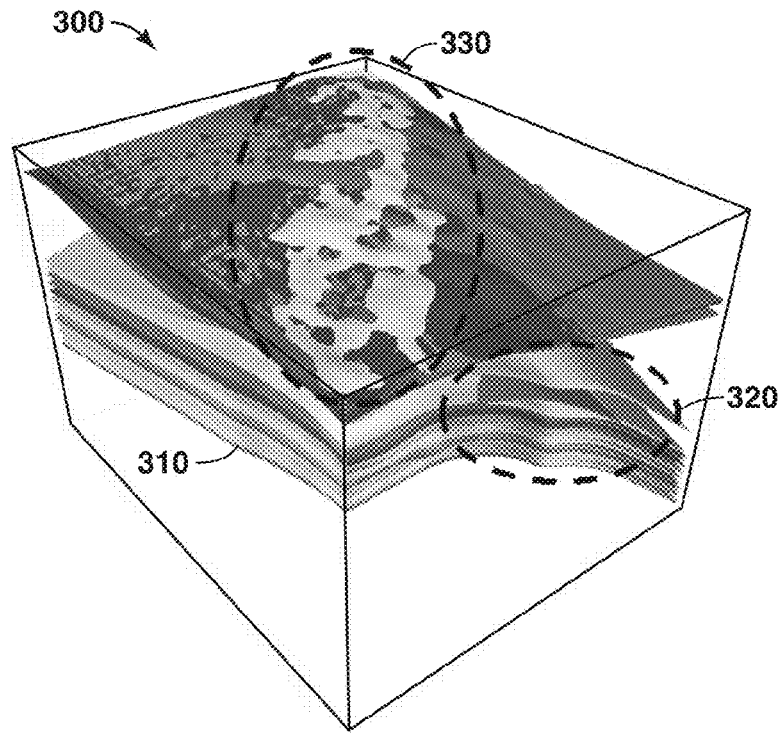
FIG. 3 is a sectional view of an illustrative oil reservoir which is being modeled. The oil reservoir is the product of survey data that has been taken from geologic structures and translated into stratigraphic layers. A series of stratigraphic layers is seen.

FIG. 3 is a cross-sectional view of an illustrative oil reservoir 300 which is being modeled. The oil reservoir 300 is the product of survey data that has been taken from geologic structures, and translated into stratigraphic layers 310 in accordance with steps 112-116. A series of stratigraphic layers 310 is seen in FIG. 3.

In FIG. 3, the layers 310 include an area of "pinchout" 320. In addition, the layers 310 include erosional features 330. Pinchouts and erosions, or vanishing layer thicknesses, may arise from tectonic forces within the earth and from erosion. The presence of pinchouts 320 and erosive zones 330 makes it more difficult for an analyst to develop a numerically tractable geomechanical model for field-wide computer simulation. Indeed, correcting numerical singularities with human interactions, even aided by existing CAD (computer aided design) tools, can be prohibitively time consuming for generating accurate computer models. Therefore, an optional aspect of the geomechanical modeling method 100 is to recognize erosional features and pinch outs and to map such structural nonconformities as done in FIG. 3. This is indicated in FIG. 2 by Box 118.

To take into account structural nonconformities, a process has been developed to sort through the depth of the geologic structures and to identify geologic singularities such as pinchouts 320 and erosional features 330. Once such features 320, and 330 are identified, correct depth ordering is restored. In addition, using the modified pre-processor, regions of zero thickness are assigned with a positive volume along with flow and structural properties that approximate the singular features.

In order to identify geological nonconformities, the modified pre-processor checks the nodes created from the map-based geological model 110. Checks are conducted at incremental locations to determine whether the depth represents an increasing order. If the order is non-increasing, this indicates that some of the nodes penetrate to other layers. This signifies an erosive zone. On the other hand, if there are nodes having the same depth, this indicates a collapse. This, in turn, signifies a pinchout.

When either of these conditions is determined, the elements have a zero thickness. To correct for the nonconformity, the element is given a positive thickness. This provides for volume.

In order to create a mesh acceptable for finite element analysis, the pre-processor scans nodes in the x- and y-directions through the depth of the geomechanical system to identify the location of the nodes. When these singular nodes are identified, an appreciable pinch-out relief distance is given to create elements of positive volume. Stated another way, the pre-processor separates the nodes by a given thickness in the vertical direction between two nodes. This process is repeated until all the nodes are separated from each other. Consequently, all elements are assigned a positive volume.

It is noted that the mesh, or map-based model, that is generated from the modified pre-processor represents data that resides in a digital domain. In other words, as a result of establishing the geologic structure 110, a subsurface structure is mapped and discretized in a particular domain. That domain has certain local coordinates within the domain. Boundaries are provided at the outer edges of the domain. The boundaries are defined by certain parameters referred to as boundary conditions. Such parameters for an oil reservoir simulation may include the formation pressure and temperature history. This information is generated from the subsurface data acquired in the steps 112 and 114. This information may also be obtained from other reservoir flow simulations. Such information may be adopted as sets of boundary conditions for the geologic structure 110.

It is desirable to represent the local coordinates and boundary conditions in the geological structure 110 in terms of nodes within a finite element analysis domain. In this way, geomechanical modeling can be conducted. Thus, referring back to FIG. 1, a next step in the modeling method 100 is the creation of a finite element mesh. This step is illustrated at Box 120. The purpose of step 120 is to take the mesh representing the geologic structure 110 (a map-based model) and convert it into a mesh 120 for finite element analysis.

Figure 4:
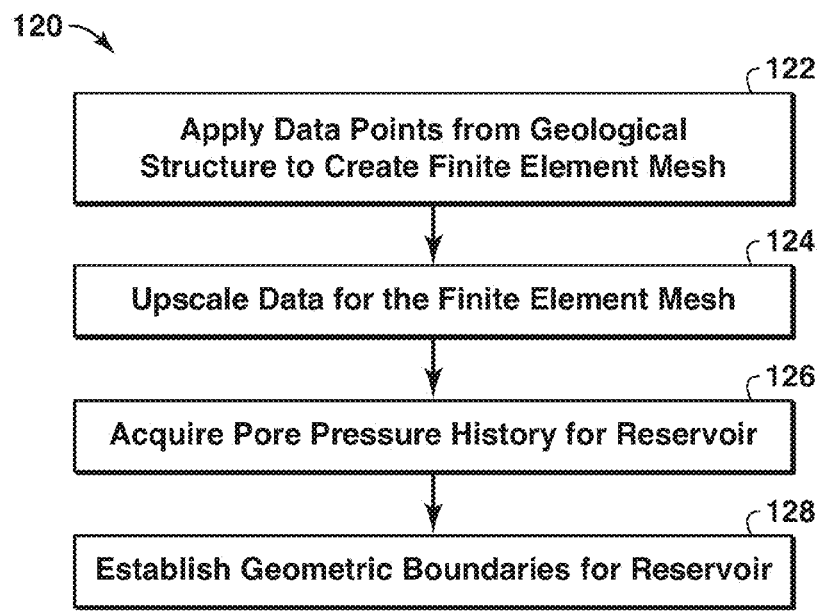
FIG. 4 is a flow diagram illustrating steps for creating the geomechanics finite element mesh from the geomechanical modeling method of FIG. 1, in one embodiment.

FIG. 4 presents procedures in connection with step 120. Under step 120, a geomechanics finite element mesh is created. In order to create the finite element mesh 120, data points are taken from the geologic structure 110, and then input into a utility program. This is shown at Box 122 of FIG. 4.

In creating the new mesh 120, the production history is first considered. The production history, which includes pressure and temperature mapping, is carried out using a weighting algorithm. The weighting algorithm relies upon search volumes. Preferably, the search volumes are ellipsoids. This means that a search ellipsoid is defined around each node. Ellipsoids (such as in the shape of a football) are preferred because the reservoir thickness is small compared to the other two dimensions. This gives the user the flexibility to approximate most volumes by adjusting its semi-axes. For example, the ellipsoid equation may be modified to a plane domain by assigning larger semi-axes in the in-plane directions, and smaller values in the thickness direction. However, it is understood that other search volumes such as cylinders may be used as part of the algorithm.

The algorithm uses a distance-space weighted function to find a base value to represent the pore pressure in the geomechanical model. In other words, the weighting scheme is based on distance between the geomechanical node and the reservoir analysis node. In the preferred embodiment, a three-dimensional weighting scheme is formulated whereby nodal quantities for the geomechanical simulation 110 are mapped from a spatial neighborhood of reservoir simulation gridpoint quantities. The reservoir simulation gridpoints are known for their pressure and temperature from the pre-solved reservoir analysis.

In operation, the weighting scheme calculates the nodal quantity p(r) in the geomechanical model based on the nodal quantity $P_i$ from the reservoir analysis gridpoints through the following equation, $$p(r) = \frac{\sum_i w_i P_i}{\sum_i w_i}$$

in which, $$\frac{1}{w_i} = \frac{(r_x - \xi_x)^n}{a^n} + \frac{(r_y - \xi_y)^n}{b^n} + \frac{(r_z - \xi_z)^n}{c^n}$$

wherein,
r is the position vector of a geomechanical node;
$r_x$, $r_y$, and $r_z$ are the position vectors of the reservoir analysis nodes, respectively;
a, b, c are the semi-axes of the three principal directions of a searching ellipsoidal domain;
n is the power of weighting; and
$w_i$ is the distance based weight.

The reservoir is mapped based on the property (e.g. pressure or temperature) of the surrounding reservoir analysis gridpoints inside the searching ellipsoid.

| | |
|---|---|
| p | property at geomechanical node |
| $P_i$ | property at reservoir gridpoints |
| $w_i$ | distance-based weight |
| r | geomechanical nodal position vector |
| $r_x$ | x component of geomechanical nodal position vector, m |
| $r_y$ | y component of geomechanical nodal position vector, m |
| $r_z$ | z component of geomechanical nodal position vector, m |
| $\xi$ | reservoir analysis nodal position vector |
| $\xi_x$ | x component of reservoir analysis nodal position vector, m |
| $\xi_y$ | y component of reservoir analysis nodal position vector, m |
| $\xi_z$ | z component of reservoir analysis nodal position vector, m |
| a | semi axis of searching ellipsoid in x direction, m |
| b | semi axis of searching ellipsoid in y direction, m |
| c | semi axis of searching ellipsoid in z direction, m |
| n | exponent of weighting |

It should be noted that in many cases, the quantity of data used in a geologic model is much greater than what is needed or desired in creating a finite element model. Therefore, one optional aspect to the step 120 is "upscaling" or reducing the amount of data while maintaining an accurate mathematical description. This is shown in Box 124. Upscaling is an integral feature to most gridding programs, including FloGrid™.

The purpose for creating the finite element mesh 120 is to determine movement of the rock matrix within the reservoir under study in response to changes in fluid pressure. In addition, movement of the rock matrix within the reservoir in response to changes in temperature may be determined. Finite element analysis allows the analyst to determine the response of the "elements" to changes in the geomechanical system. In order to meet this purpose, the pore pressure and, optionally, the temperature within the reservoir are initialized at various points. In practice, information concerning pore pressure history inside the reservoir is acquired. The step of acquiring historical pore pressure data is indicated in Box 126.

The known points of data are referred to as "nodes." Each of the nodes is mathematically provided with one or more degrees of freedom. This is part of the "discretization" or "mesh generation" process. The degrees of freedom represent permitted movements in the rock in response to changes in fluid pressure during production or injection. These may also be referred to as "Gaussian integration points." A mathematical approach is taken to describe how each point or node displaces relative to each other for a given initialized state.

In addition, the reservoir has physical boundaries. Boundaries are provided at the outer edges of the domain. The boundaries have known (or approximated) pore pressure values and geomechanical properties. The pore pressure and geomechanical values at the boundaries represent the "boundary conditions."

In an oil reservoir simulation, a finite element model traditionally seeks to represent properties of the reservoir by using a mathematical function which gradually changes according to the position within the reservoir boundaries. However, it is difficult to force these functions to approximate changes in the properties which occur very abruptly as a result of geological features within the reservoir. For instance, a reservoir may have two distinct layers, each of which has a substantially different value for a given property (e.g., porosity) at the boundary between these two layers. A mathematical function representing the value of the properties might therefore have to make an immediate transition from one value to the other at the boundary between the layers. Therefore, as noted above, a utility computer program is offered which incorporates repair capabilities to convert the geologic structure 110 into the finite element geomechanical model 120. Consequently, two constitutive material models are preferably given to these two layers. The governing equation then incorporates these two material models into sets of equations to be solved. The compatibility and force (flux) equilibrium will be satisfied as the equations are solved.

In connection with establishing boundary conditions, the geometric boundaries themselves need to be established for the reservoir. The step of establishing boundaries for the geomechanical model is indicated at step 128.

As part of establishing boundaries, the geomechanical stresses assumed for the production area under study may need to be adjusted. For example, the model may need to be adjusted to reflect in situ tectonic forces acting upwardly from below the production area under study. Alternatively, the model may need to be adjusted to reflect in situ tectonic forces acting from one side of the production area under study. Alternatively still, the model may need to be adjusted to reflect an overburden acting downwardly on the production area under study. In this way, initial stresses on the production area are more accurately characterized.

In the present method of geomechanical modeling 100, the external stresses, be they under-, over-, or side-burden, may be generated through a process of extrapolation. This means that information from inside of the domain or production area under study 120 is extrapolated to outside of the domain. This is done by using the geomechanical model that incorporates the weight of each individual layer including under- or over- or side-burden, the hydrostatic load on the surface of the overburden and far field boundary conditions to reach a "geostatic" equilibrium under several iterations. A "geo-static equilibrium" means the model carries some initial stress where the model yields non-appreciable displacements before any human interference.

Alternatively, stress data may be obtained from an interpolation of neighboring fields and/or neighboring wells. This means that far-field boundary conditions are considered, and then the data is "filled in" for the production area under study. This may be done, for example, by leak-off tests from downhole measurements.

In some instances, the production area under study may be too close to a model boundary. When this occurs, it may be desirable to expand the domain by adding a side-burden. This is done by extending the boundary of the model by adding side-burden to the original model. Preferably, the side-burden is at least three times larger than the original model.

A next step in the geomechanical modeling method 100 is the input of rock material properties into the finite element mesh 120. Rock material properties refers to the constitution or makeup of the rock as well as its permeability, its porosity, its elasticity, and other features. The step of inputting rock material properties is shown at Box 130 of FIG. 1.

A variety of tools may be used to acquire information concerning rock material properties. One source of data is core test data. Core test data refers to data taken from core samples. This may include rock lithology, porosity, and permeability. Various tests may be run on core samples in order to acquire this information. Core samples are considered the most useful source of rock data since they provide tangible and physical information concerning the make-up of subsurface rock formations at given depths.

Loading tests may also be performed in order to determine the rock's elastic properties. Typical tests include cyclic conventional geomechanics tests, uniaxial tests, or triaxial tests. The tests may be performed on the core samples in both drained and un-drained conditions, that is, in both dry and saturated conditions. For example, a sample may be taken to failure under load to determine failure properties so as to map the rock in a Mohr Coulomb or Drucker-Prager analysis. Such analyses may provide Young's modulus, Poisson's ratio, Lame' constants, and other rock properties that may be calculated according to formulae known by those skilled in the art of geomechanics. Other "critical state" models such as the Cam-clay model are known and may also be used. In any instance, the rock material/property model 130 is constructed using either elastic or elastoplastic models based on the analyst's judgment.

In connection with an evaluation of geomechanical stresses and failure criteria, it is generally recognized that rocks are strong in compression but weak in tension. This is particularly true for rocks with natural fractures. For these rocks, compressive stresses will tend to leave fractures closed, but tensile stresses will open the rock and encourage fracture growth. By this criterion, any portion of a rock subjected to tensile stress is likely to fail. Tensile stresses may come into play in an overburden where fluid is removed from a subsurface formation.

In practice, failure points are determined by breaking core samples in compression under different confining pressures. The uniaxial and triaxial compression laboratory test procedures and calculations used to define the failure line in a Mohr-Coulomb analysis are known to those of ordinary skill in the art of geomechanics. When considering porous rocks with an internal pore fluid under pressure, the stresses correspond to "effective stresses." The "effective stress" on a porous rock is the normal total stress minus the pore fluid pressure. The concept of "effective stress" and its use is also known to those skilled in the art.

Well log data is also used to assess rock material properties. Data derived from well logs may inform as to both rock makeup and elastic properties. For example, gamma ray logs and density logs are useful in determining the amount of shale in a rock, which infers the presence of clay. Sonic logs can be used to calculate elastic properties. Porosity logs may also be used for porosity determinations.

It is noted that the geomechanical modeling method 100 may employ constitutive models when analyzing rock properties 130. A constitutive model takes into account the fact that certain properties normally considered to be constant, such as porosity, may change in response to other factors such as stress or strain or temperature. Constitutive behavior represents a modeling framework which captures the evolution of a particular material property over time. The constitutive model provides a mathematical model that describes how those properties evolve as a function of some other parameter, usually in time.

In the context of the utility program for the finite element mesh 120, the constitutive model may be prepared by assigning the Young' modulus, Poisson's ratio, initial yield stress, friction angle, plastic hardening curve, or other factors compiled from laboratory core test results. The selected values are assigned to the finite element mesh.

For a formation under geomechanical study, the formation thickness is also an important parameter. The thickness of the formation may change in response to stress, strain, temperature, or other factors. Geomaterials also exhibit pressure-dependence. Therefore, built into the framework of the mathematical Mohr-Coulomb/Drucker Prager failure criteria is the failure behavior of the rock in response to changes in pressure.

The mathematical framework also takes into account the failure mode of the rock. For example, if the rock is elastic it is generally going to reform back to its original shape in response to stress. However, if the rock is plastic it is more likely to shear in response to stress. The failure mode may also take into account whether a particular rock may shear under compression, or form shear bands. The response of a rock matrix may be calibrated with laboratory tests to determine response for plastic behavior or nonlinear elastic behavior. The failure mode may be analyzed mathematically using geomechanical properties, such as the Mohr-Coulomb failure criteria.

A next step in the geomechanical modeling method 100 is geostatic initialization. This step is indicated at Box 140. The purpose of this step 140 is to initialize the geomechanical condition of the formation at issue.

The geomechanical initialization step 140 relies upon a variety of information that is mathematically incorporated into the utility program of the mesh 120. This information may come from well log data, drilling records, and/or initial well test data. The initial stress state is calculated and calibrated based on this information. Optionally, far-field boundary conditions are imposed on the created geomechanical model as described above in connection with step 128.

Figure 6:
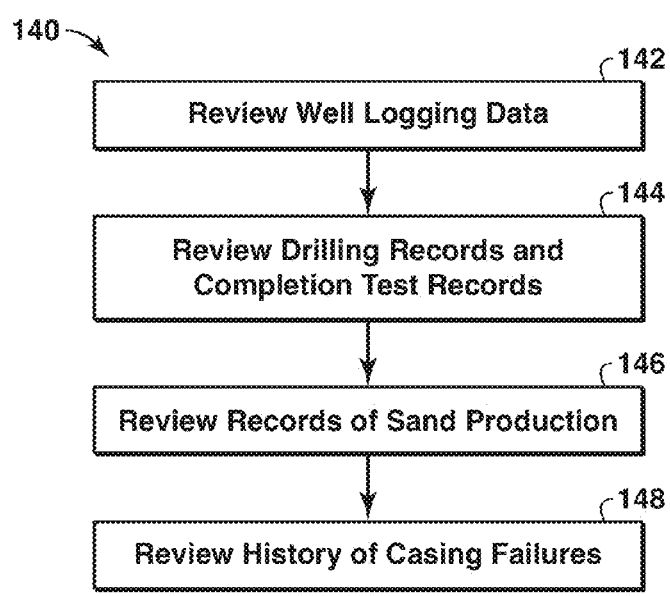
FIG. 6 is a flow diagram illustrating steps for initializing the geostatic condition of the geomechanical modeling method of FIG. 1, in one embodiment.

FIG. 6 provides a flow chart that outlines data considered in connection with the geomechanical initialization step 140. First, various well logging data may be used. This is shown at Box 142. Examples of well logs that may be consulted include density logs, FMI logs and caliper logs.

Density logs inform the analyst as to the density of the formation under study. This is useful as it is used to distinguish the producing and non-producing layers.

FMI logs, or "formation microimaging" logs, detect fractures within the formation. Such fractures may either be naturally occurring fractures, or may be induced by fluid pressures inherent in the drilling process. FMI logs are instructive as they indicate the strength of the rock formation.

Finally, the caliper log measures the radius of a wellbore as a function of depth. The caliper log can provide an indication of washouts, bore hole collapse, or other drilling-induced variations in radius. This also may be indicative of rock strength.

Next, the analyst may consider drilling records and completion test records. This is shown at Box 144. Drilling records may record instances of fluid loss or "lost returns" during wellbore formation. This, in turn, is also indicative of formation strength. In some instances, leak-off tests are performed during the drilling process in order to intentionally step right up to the fracture gradient of the formation at selected depths. The analyst may use this information to more accurately characterize pressures and stresses.

Records of sand production within the development area may also be instructive. This is shown at Box 146. In this respect, the presence of sand production from a certain depth informs the analyst about the mechanical characteristics of the formation, particularly at the face of the formation. For example, the presence of sand in the production fluids is an indication of the cementation strength of the formation. This, in turn, may assist in calibrating failure criteria.

Finally, information concerning the history of casing failures in the development area would also be highly useful. This is shown at Box 148. If casing failures have occurred, this probably is evidence of formation shear occurring in the region as a result of subsidence or heave. This would suggest potentially weak facies. For example, a formation comprised of bentonite or other depositional phase material might not show up in the log data. Bentonite is considered to have a low internal friction or low cementation, meaning that it is weak. Bentonite and shale formations are considered to be strong in compression but weak in shear.

A next step in the geomechanical modeling method 100 is actually running the program. This step is indicated in FIG. 1 at Box 150.

Because the mesh lies within a producing zone, the pore pressure within the mesh or inside the "producing mesh domain" will change as a function of time. Using the finite element analysis mesh 120, as the pressure changes, stresses acting inside of the mesh may be predicted. Such stresses may include a compaction strain ($\epsilon_{3-3}$) and out-of-plane shear strains ($\gamma_{1-3}$, $\gamma_{2-3}$).

In order to run the utility program, the data is input into a simulator or "solver." A solver is a program that is able to solve the governing equations of interest. In geomechanics, the solver finds the solution that satisfies force equilibrium, compatibility and constitutive laws. In one aspect, the program is an available geomechanics software program such as ABAQUS™.

Figure 5:
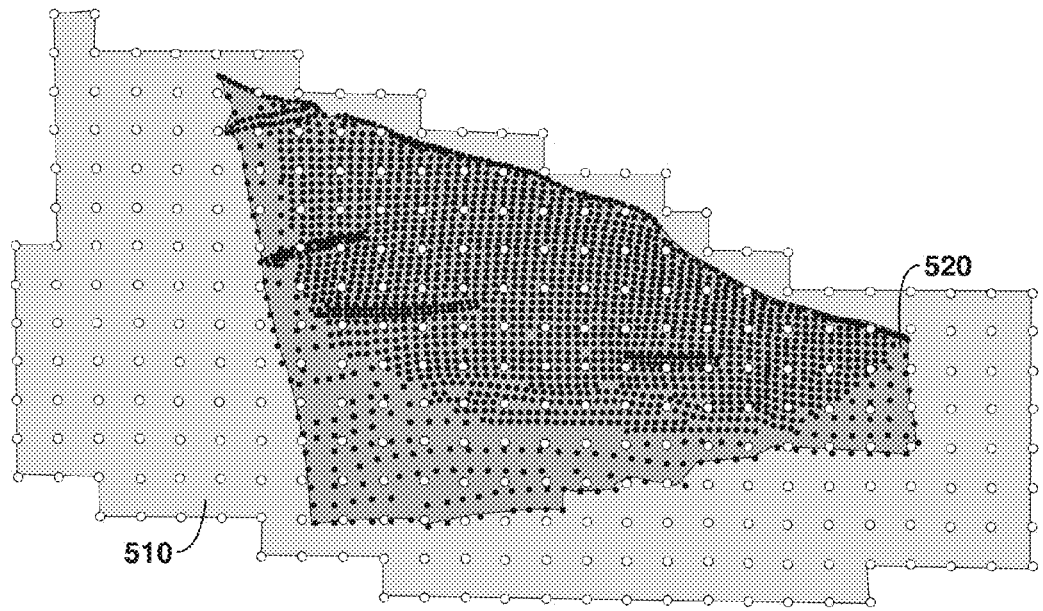
FIG. 5 indicates operation of two reservoir flow simulators. The first is a series of ABAQUS-modeled nodes set out in a uniform grid. This is from a finite-element analysis. The second is a map-based mesh.

FIG. 5 indicates the operation of the utility program and the subsequent ABAQUS simulator. Two reservoir flow simulator grids 510, 520 are shown. Simulator 520 represents the reservoir model grid blocks or gridpoints from the finite element mesh 120. The other simulator 510 is a series of ABAQUS-modeled nodes. The ABAQUS™ simulator sets out the nodes from the reservoir simulator into a more uniform grid.

A matrix is created within the physical boundaries. The matrix defines the properties of the various elements within the physical boundaries. The matrix includes a vector that defines the forces acting on each element in the structure. Once all the element matrices and vectors have been created, they are combined into a structure matrix equation. The structure matrix equation relates nodal responses for the entire structure to nodal forces.

After applying boundary conditions, the structure matrix equation is solved to obtain unknown nodal responses. Intra-element responses can be interpolated from nodal values using the functions which were defined over each element. Such interpolation is done through the utility program.

It is noted that most commercial reservoir flow simulators such as ECLIPSE™ only predict pressure and temperature changes within the reservoir. Such simulators lack the capability to solve for earth stress changes within and outside the reservoir. However, a separate solver such as ABAQUS™ allows the simulator to solve for the earth stress changes. Again, these may represent a compaction strain ($\epsilon_{3-3}$) and out-of-plane shear strains ($\gamma_{1-3}$, $\gamma_{2-3}$).

It is also noted that in the creation of the geomechanical model 120, the model may represent a large area, for example, up to 100 miles by 100 miles. Within this model 120, a series of elements that are, for example, a half mile by a half mile in area may be created. However, it may be desirable for the analyst to inspect or understand the geomechanical condition of a smaller area within an individual element. Accordingly, a submodeling technique has been developed that allows the analyst to more accurately characterize a smaller portion or domain of a production area under study. Stated another way, submodeling means the ability to analyze or "zoom in" on a smaller domain within the overall production area.

The submodel defines a complimentary finite-element-based submodel having increasing levels of refinement from the finite element mesh. By increasing the level of refinement, the resolution is improved due to the smaller domain and the presence of additional elements employed in the submodel. It is understood that it is not practical to have small element sizes of, perhaps, several feet when the region of interest is in excess of, perhaps, 100 or more miles. By progressive transition from a larger global model to a smaller submodel, the program can more accurately solve the physical variables of interest.

As noted, the overall model 120 is defined by the boundary conditions established in the program. Such boundary conditions may include a distributed load representing the weight of the overburden. The boundary conditions may also include the internal pressure and temperature boundary conditions as a function of depth. From there, submodeling of the production area under study may be applied.

The submodeling takes into consideration the production history within the reservoir. This includes drawdown information, depletion history, historical production rates, individual well tests, and post-completion well logs. The submodeling may also take into consideration casing failures that may have occurred within the field under study.

In order to create the submodel, the analyst identifies a region of interest. Then appropriate submodel boundaries are defined. The submodel is assigned a more discretized mesh to obtain better resolution of physical properties. This process could be repeated for several levels, meaning that two, three, four or "n" number of size domains may be consecutively analyzed to allow the analyst to zoom in to a point within the reservoir model.

For example, the analyst may move from a global level that is 100 miles×100 miles, to several intermediate submodels that are 1 mile×1 mile, and finally to a near well bore level that is 1 foot×1 foot. The benefit is that strain values ($\gamma_{1-3}$, $\gamma_{2-3}$) may now be determined at nodal points in the finite element mesh.

Figure 7:
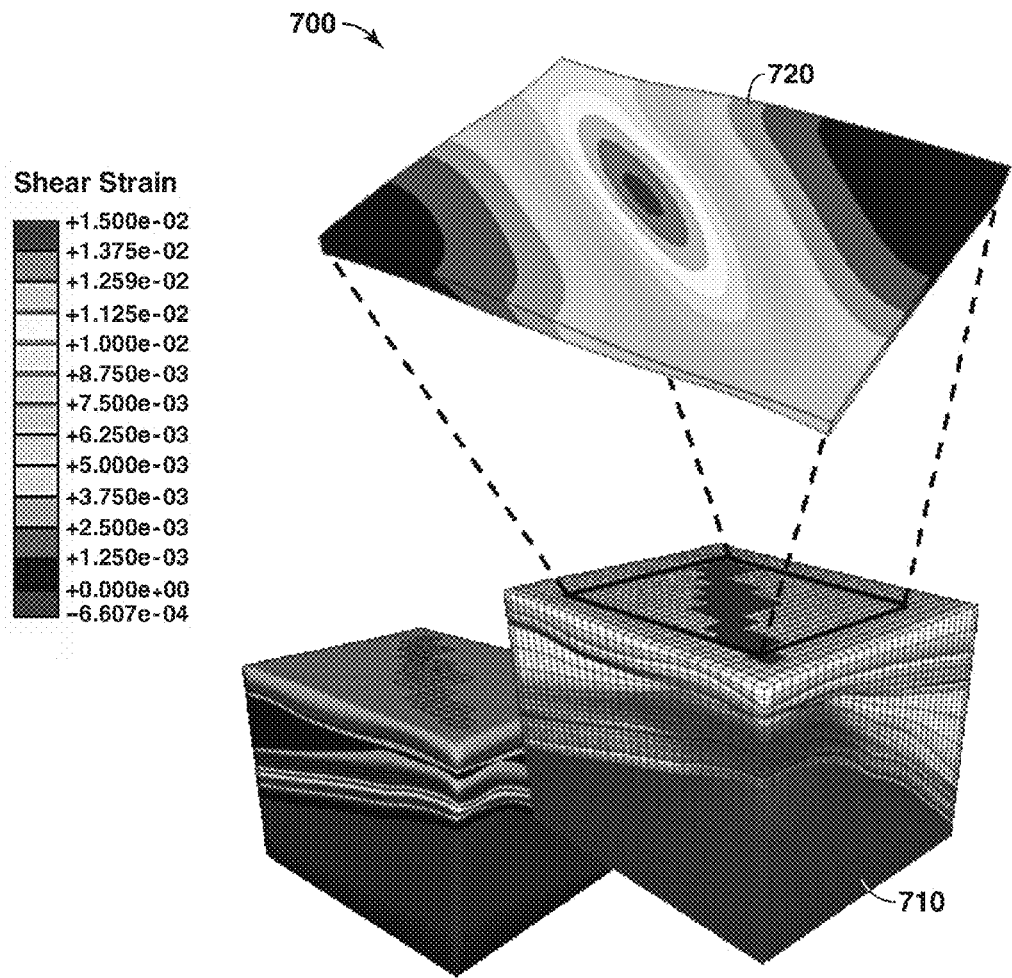
FIG. 7 presents a sectional view of a global model and submodel of a geomechanical model without nonconformities. The inset of FIG. 7 shows the contour of effective shear strain of a submodel caused by in-situ stress changes from production.

FIG. 7 presents a sectional view of a global model 700. The model 700 demonstrates a formation 710 under study. In this illustrative embodiment, the formation 710 is without nonconformities.

In FIG. 7, an inset 720 is shown. The inset 720 demonstrates the contour of effective shear strain caused by in-situ stress changes from production. The inset 720 of FIG. 7 shows the contour of effective shear strain of a submodel caused by the in situ stress changes from production. The contour plots shows region of high shear strain that correspond to higher kink angle of casing. Thus, one result of running the geomechanical simulation model 100 is the ability to determine shear strain acting within the formation in response to changes in pore pressure.

Finally, a step in the modeling method 100 may be consistency analysis. This step is shown at Box 160. The purpose for the consistency analysis 160 is to provide a peer review of the results. This, in turn, enhances the accuracy of the modeling method 100.

The peer review may be a human peer review. In this instance, a human peer will exercise his or her engineering mechanics judgment and geomechanics modeling experience to confirm that the results of the simulation 100 are reasonable or acceptable. This step 160 is a subjective review as opposed to simply manipulating data. However, in some cases, the peer review may be conducted through a separate program.

Figure 8:
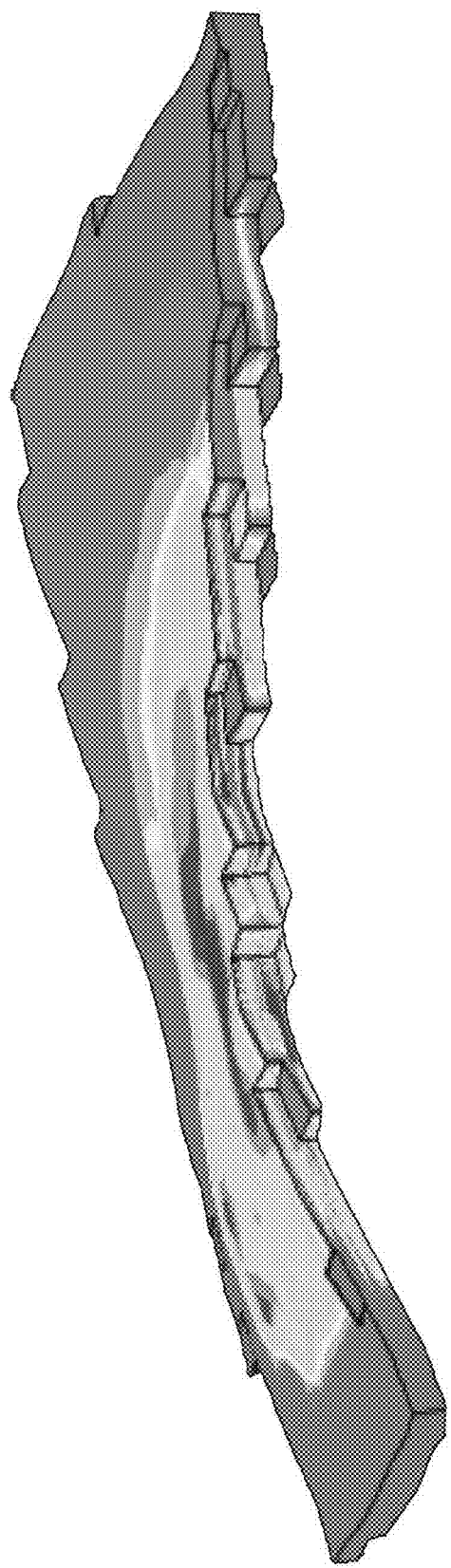
FIG. 8 is a pressure contour plot mapped from a geomechanical modeling simulation.

FIG. 8 is a pressure contour plot mapped from a reservoir simulation. In this simulation, the exponent of weighting ("n") equals 2. A multi-scale geomechanical simulation is implemented based on an assumed production history. It is noted that a region of high depletion will result in a reduction of pore pressure. This, in turn, will yield higher compaction within the reservoir potentially leading to surface subsidence.

Figure 9A:
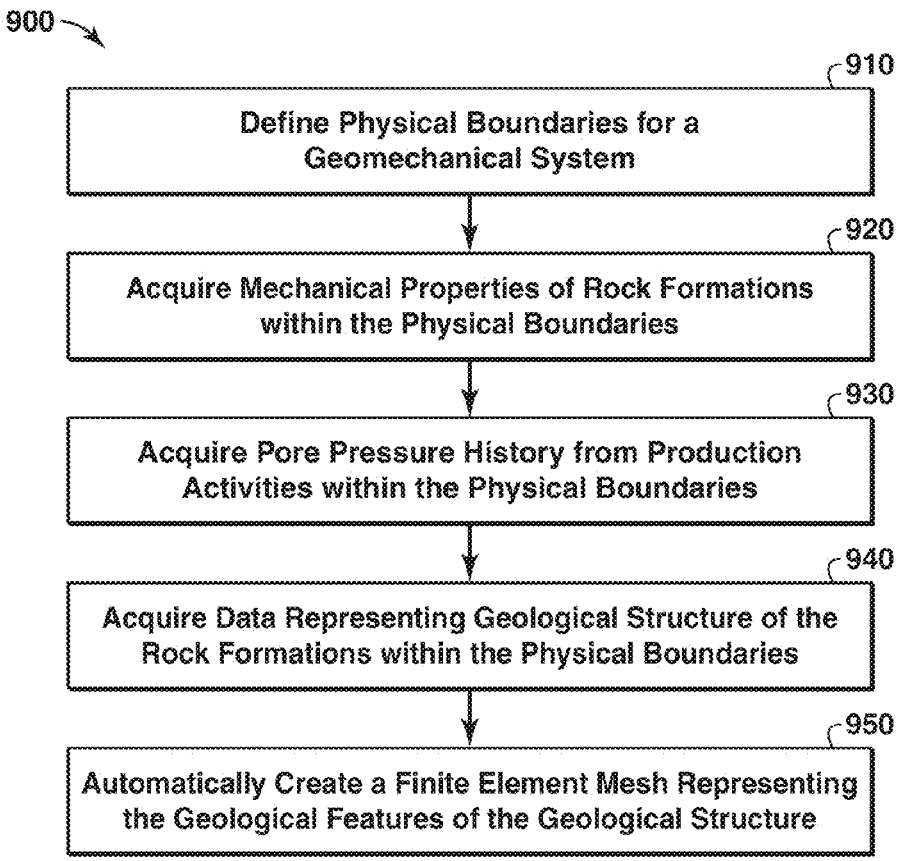
FIGS. 9A and 9B present a flow chart showing steps that may be taken to run a reservoir simulation model in accordance with one embodiment of the present invention.
Figure 9B:
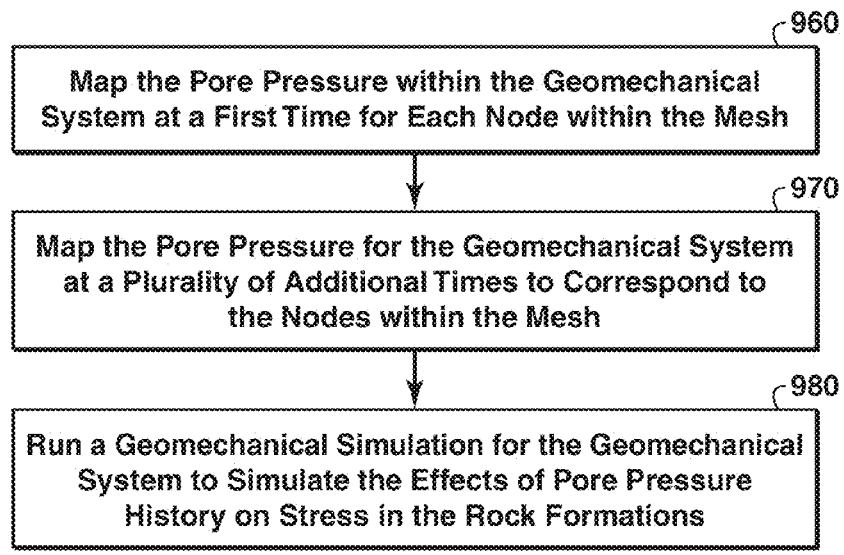

In order to use the geomechanical modeling method 100 to perform reservoir simulation, a series of steps may be taken. FIGS. 9A and 9B together present steps which, in one embodiment, provide a new reservoir simulation method 900. The purpose of the method 900 is to evaluate whether changes in reservoir pressure as a result of production activities will negatively affect formation stability. Such production activities may be the withdrawal of reservoir fluids from a reservoir, injection of fluids into a reservoir under study, or a combination thereof.

The method 900 may be generally characterized as a computer-implemented method for modeling a geomechanical system. In one aspect, the method 900 first includes defining physical boundaries for the geomechanical system. This step is indicated at Box 910 of FIG. 9A. The step of Box 910 is consistent with Box 128 of FIG. 4, described above.

The method 900 also includes acquiring mechanical properties of rock formations within the physical boundaries. This step is indicated at Box 920 of FIG. 9A. The step of Box 920 is consistent with Box 130 of FIG. 1, described above.

The method 900 also includes acquiring pore pressure history from production activities within the physical boundaries. This step is indicated at Box 930 of FIG. 9A. The step of Box 930 is consistent with Box 126 of FIG. 4, described above. Acquiring pore pressure history 930 may optionally include acquiring other reservoir characteristics such as temperature history, porosity or permeability.

The method 900 also includes acquiring data representing geological structure of the rock formations within the physical boundaries. This step is indicated at Box 940 of FIG. 9A. The step of Box 940 is consistent with Boxes 112 and 114 of FIG. 2, described above. The step 940 may be part of the preparation of a map-based geological model.

The method 900 also includes automatically creating a finite element mesh representing the geological features of the geomechanical system. This step is indicated at Box 950 of FIG. 9A. The step of Box 950 is consistent with Boxes 122 and 124 of FIG. 4, described above. In this respect, step 950 may be the derivation of a finite-element based geological model from a map-based geological model.

The mesh defines a plurality of nodes representing points in space. Each of the points has potential displacement in more than one direction, meaning more than one degree of freedom. Such displacement may be translational in an "x," a "y," or a "z" direction. Such displacement may also optionally be rotational about a plane in the "x" direction, a plane in the "y" direction, and/or a plane in the "z" direction.

It is preferred that the mesh provide a positive value for any rock formations indicated from the data representing the geological structure to have a zero thickness. The purpose is to create volume for that rock formation. In this way, the repair of singular geologic entities such as "pinchouts" and erosional features is automated. The geological structure may be converted into a finite element mesh using a utility program that is compatible with a finite element analysis solver such as ABAQUS™.

The method 900 also includes mapping the pore pressure within the geomechanical system at a first time for nodes within the mesh. This step is indicated at Box 960 of FIG. 9B. The step of Box 960 is different from the step of Box 930, in that the pore pressure history acquired in step 930 is now being loaded into the utility program at the first time.

The method 900 also includes mapping the pore pressure for the geomechanical system at a plurality of additional times to correspond to the nodes within the mesh. This step is indicated at Box 970 of FIG. 9B. This means that the pore pressure history acquired in step 930 is now being loaded into the utility program at a plurality of additional times.

Finally, the method 900 includes running the reservoir simulation for the geomechanical system to simulate the effects of pore pressure history on stress in the rock formations. This step is indicated at Box 980 of FIG. 9B. The step of Box 980 is consistent with Box 150 of FIG. 1, described above. The effects may be mathematically quantified in the form of compaction strain values ($\epsilon_{3-3}$) and out-of-plane shear strain values ($\gamma_{1-3}$, $\gamma_{2-3}$) at selected locations within the geomechanical system. Preferably, the out-of-plane coordinates are transverse to the compaction strain coordinate.

As can be seen, an improved method for geomechanical modeling is offered herein. The method employs multi-scale geomechanical computer simulations of earth stress changes associated with the hydrocarbon recovery process. In various embodiments, the method allows an analyst to map pressure, temperature, fluid flow, displacement or stress boundary conditions from a map-based discretized simulation domain to a three-dimensional, finite-element-based discretized simulation domain. The methods herein may have particular application in thermally enhanced hydrocarbon recovery areas such as oil shale formations, Cold Lake CSS, and South Belridge DSD. The methods may further have application in hydrocarbon recovery processes in stress-sensitive developments such as those found in West Africa, Chad, and GOM.

While it will be apparent that the invention herein described is well calculated to achieve the benefits and advantages set forth above, it will be appreciated that the invention is susceptible to modification, variation and change without departing from the spirit thereof.

What is claimed is:

1. A computer-implemented method for the automated modeling of a three-dimensional geomechanical system, comprising:
   defining physical boundaries for the geomechanical system;
   acquiring subsurface data and mechanical properties of rock formations within the physical boundaries;
   acquiring one or more reservoir characteristics from production activities within the physical boundaries;
   running a pre-processor at a first time related to the production activities to create a finite element system mesh representing the geomechanical system, the mesh defining a plurality of elements having system nodes representing points in space, with each element being populated with the mechanical properties, the one or more acquired reservoir characteristics, and the subsurface data;
   running a geomechanical simulation model for the geomechanical system at each of a first time and another time to simulate the effects of changes in stress on one or more modeled reservoir characteristics in the geomechanical system;
   determining from the simulation model, system node displacement, traction changes, and stress changes for each element within the system from the first time to the another time within the system mesh;
   identifying a subset system of the geomechanical system for modeling analysis at high mesh resolution and defining host elements of the geomechanical system that comprise the subset system;
   running a pre-processor over the subset system host elements to create a high resolution finite element system mesh representing the subset system, the high resolution mesh defining a plurality of high resolution elements having high resolution system nodes representing points in space with each high resolution element being populated with the mechanical properties, the acquired one or more reservoir characteristics, and the subsurface data;
   transferring by interpolation, the determined system node displacement, the traction changes, and the stress changes from the determined results of the geomechanical system simulation model to the high resolution subset system nodes; and
   running a geomechanical simulation model for the subset system at high resolution, at each of a first time and another time to simulate the effects of changes in stress on one or more modeled reservoir characteristics in the subset system.

2. The method of claim 1, wherein the geomechanical system comprises a hydrocarbon reservoir.

3. The method of claim 2, wherein the one or more reservoir characteristics comprise temperature history, pore pressure history, permeability, porosity, or combinations thereof.

4. The method of claim 3, wherein:
   changes in the one or more reservoir characteristics comprises changes in pore pressure within the rock formations; and
   changes in pore pressure within the rock formations are designed to simulate a decrease in pore pressure in connection with a production of hydrocarbons from the hydrocarbon reservoir.

5. The method of claim 3, wherein:
   changes in the one or more reservoir characteristics comprises changes in pore pressure within the rock formations; and
   changes in pore pressure within the rock formations are designed to simulate an increase in pore pressure in connection with an injection of fluids into the hydrocarbon reservoir.

6. The method of claim 3, wherein the mesh provides a null value for any rock formations having a zero thickness as derived from the subsurface data.

7. The method of claim 6, further comprising:
   creating a finite-element-based submodel based upon the finite element mesh but having levels of refinement in the nodes that is different from refinement levels of the pre-processor created finite element mesh.

8. The method of claim 3, wherein the production activities comprise the withdrawal of hydrocarbons from a reservoir or the injection of fluids into the reservoir.

9. The method of claim 3, wherein the physical boundaries for the geomechanical system and the subsurface data for the rock formations within the physical boundaries are entered into a pre-processor program to create a grid in a map-based computer model.

10. The method of claim 9, wherein the grid in the map-based computer model defines a three-dimensional grid.

11. The method of claim 10, wherein the three-dimensional grid is automatically compiled from the subsurface data.

12. The method of claim 3, wherein:
the physical boundaries for the geomechanical system and the subsurface data for the rock formations within the physical boundaries are entered into a pre-processor program to automatically create a three-dimensional grid in a map-based computer model;
the subsurface data comprises well logging data, seismic data, or combinations thereof; and
the three-dimensional grid defines nodes in a geological structure that are converted into the nodes of the finite element mesh as a result of creating the finite element mesh.

13. The method of claim 12, wherein automatically creating a finite element mesh is performed by running a utility program that is compatible with a geomechanical solver program.

14. The method of claim 13, wherein running a geomechanical simulation for the geomechanical system is performed by running the geomechanical solver program to solve for earth stress changes.

15. The method of claim 14, further comprising:
acquiring fluid flow history within the physical boundaries; and
mapping the pressure distribution due to the flow history within the physical boundaries.

16. The method of claim 15, wherein a distance-based weighted function and a searching algorithm are used to do the mapping of the pressure distribution.

17. The method of claim 6, further comprising:
comparing the simulated effects with a set of anticipated results.

18. The method of claim 6, further comprising:
running the simulated effects through a computer-implemented consistency analysis to determine if the simulated effects are consistent with anticipated results.

19. The method of claim 6, wherein the subsurface data comprises well logging data, seismic data, or combinations thereof.

20. The method of claim 19, wherein the well logging data is selected from the group comprising gamma ray logs, density logs, resistivity logs, porosity logs, sonic logs, and combinations thereof.

21. The method of claim 3, wherein:
the physical boundaries for the geomechanical system and the subsurface data for the rock formations within the physical boundaries are entered into a pre-processor program to automatically create a three-dimensional grid in a map-based computer model;
the subsurface data comprises well logging data; and
the three-dimensional grid is automatically compiled from the well logging data into a three-dimensional digital representation using an ASCII data-to-ZMap programming function.

22. The method of claim 21, wherein the pre-processor program automatically accounts for and repairs any singular geologic entities in the rock formations such as pinchouts and erosional features.

23. The method of claim 3, further comprising:
initializing a geostatic condition of the finite element mesh before running the geomechanical simulation.

24. The method of claim 23, wherein the geostatic condition is initialized based upon data from leak-off tests, well logging data, records of sand production from wells produced within the physical boundaries of the geomechanical model, completion test records, and combinations thereof.

25. The method of claim 23, wherein the geostatic condition is initialized based upon reviewing a history of casing failures from wells within the physical boundaries of the geomechanical model.

26. The method of claim 3, further comprising:
upscaling the subsurface data before automatically creating the finite element mesh.

27. The method according to claim 1, further comprising:
mapping the one or more reservoir characteristics within the geomechanical system at the first time for the system nodes within the mesh; and
mapping the one or more reservoir characteristics at the another time to correspond to the system nodes within the mesh.

28. The method according to claim 1, further comprising:
enhancing the characteristics of the high resolution nodes of the subset system with additional mechanical components and local geological features of interest.

29. The method according to claim 1, further comprising:
mapping the one or more reservoir characteristics within the high resolution subset system at the first time for the high resolution system nodes within the mesh; and
mapping the one or more reservoir characteristics at the another time to correspond to the system nodes within the mesh.

30. The method according to claim 1, wherein transferring by interpolation comprises:
calculating position vectors inside a host element and summing the product of shape functions and displacement, for each of the high resolution nodes of a host element.

* * * * *